June 26, 1951 M. D. O'DAY 2,558,373

RADIO BEACON SYSTEM

Filed July 9, 1945

INVENTOR
MARCUS D. O'DAY
BY William D. Hall
ATTORNEY

Patented June 26, 1951 2,558,373

UNITED STATES PATENT OFFICE 2,558,373

RADIO BEACON SYSTEM

Marcus D. O'Day, Arlington, Mass., assignor, by mesne assignments, to the United States of America as represented by the Secretary of War Application July 9, 1945, Serial No. 604,047

4 Claims. (Cl. 250—15)

This invention relates to radio-controlled systems and more particularly to such systems employing recognition equipment.

In many radio applications it is desirable to have a circuit at a remote point transmit a signal in response to a predetermined received signal. It is also desirable in some instances to convey certain intelligence to the circuit at the remote point. One method of sending intelligence to the distant station is to transmit a series of pulses of radio-frequency energy at a predetermined frequency and with a predetermined interval between pulses. One disadvantage of this system is that any other transmitter operating on the same frequency as the control station and sending out any series of pulses will cause the remote circuit to respond to the combination of the intended and the spurious signals.

It is an object of the present invention, therefore, to present a simple, novel system for pulse coding the information sent to the distant circuit employing a three-pulse, dual-channel code. It is a further object of this invention to provide means for causing the distant circuit to either accept or reject the information derived from the pulse repetition frequency of one set of pulses without interfering with the transmission of a reply in response to a received signal.

In accordance with the present invention, there are provided a plurality of antennas and a plurality of receivers. Means are provided for causing one of said receivers to control the operation of a second of said receivers. One of said receivers is used to control the operation of a transmitter and one of said receivers is used to control a relay. Means are provided for connecting the output of one of said receivers to a load through said relay.

For a better understanding of the invention, together with other and further objects thereof, reference is had to the following description taken in connection with the accompanying drawing in which.

Figure 1:
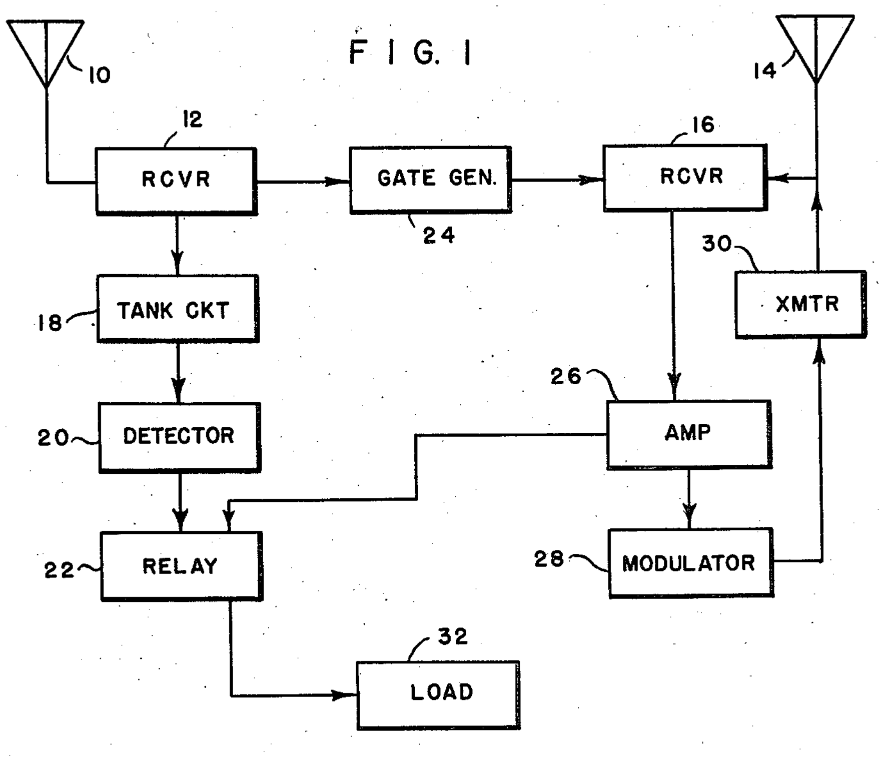
Fig. 1 is a block diagram of the invention.

Referring now more particularly to Fig. 1, there is shown an antenna 10 connected to a receiver 12. A second antenna 14 is connected to a second receiver 16. The output of receiver 12 is connected to the series combination of a tank circuit 18, a detector 20, and a relay 22. The output of receiver 12 is also connected to a gate generator 24 which is in turn connected to receiver 16. The output of receiver 16 is applied to an amplifier 26. Amplifier 26 in turn supplies a signal to relay 22 and a modulator 28. Modulator 28 is connected to a transmitter 30 while transmitter 30 is connected to the antenna 14. A load 32 is connected to relay 22.

Figure 2:
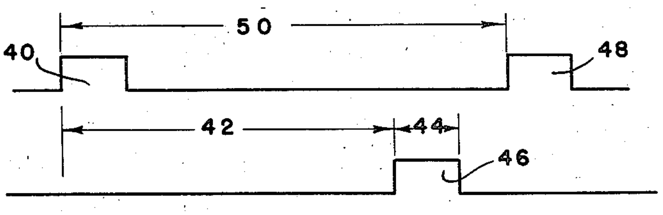
Fig. 2 is a diagram showing the time relationships that may exist between different signals present in the circuit of Fig. 1.

The circuit of Fig. 1 operates in the following manner: a pulse of energy having a frequency of oscillation that will be passed by receiver 12 is received at antenna 10. Receiver 12 detects this pulse and supplies it to gate generator 24 and tank circuit 18. This pulse is represented by pulse 40 of Fig. 2. Gate generator 24 is a type of voltage gate generator that will produce a voltage pulse of a predetermined time duration and at a predetermined time after a pulse is supplied by receiver 12. The voltage pulse supplied to receiver 16 from generator 24 renders receiver 16 capable of receiving a signal for the time interval equal to the time duration of this pulse. It will be assumed that the time interval between the beginning of pulse 40 to the beginning of the pulse supplied by generator 24 is equal to the time interval 42 shown in Fig. 2. It will be further assumed that the duration of the pulse from generator 24 is represented by time interval 44 of Fig. 2.

If a signal is received at antenna 14 during time interval 44 of such a frequency that it will be passed by receiver 16, this signal will be passed on to amplifier 26. This second received signal is represented by pulse 46, Fig. 2. Amplifier 26 causes modulator 28 to supply transmitter 30 with an activating signal whereupon transmitter 30 transmits a predetermined reply by way of antenna 14. The signal transmitted from antenna 14 is not necessarily of the same frequency as the signal supplied to receiver 16 since the frequency of the transmitted signal depends solely on the design of transmitter 30.

The pulse that was supplied by receiver 12 to tank circuit 18 causes oscillations to begin in this circuit. Tank circuit 18 is a parallel capacitor-inductor tuned circuit or its equivalent and it is so designed that the losses in the circuit are small. Therefore, oscillations set up in circuit 18 will be maintained for a considerable period of time. Detector 20 receives a signal from circuit 18 without appreciably loading that circuit and then detects and averages this received signal. The output of detector 20, therefore, is a relatively constant direct-current potential. If this direct-current potential is high enough, it will cause relay 22 to close. Whether relay 22 is held closed or remains open depends substantially on two factors:

(1) The rate at which pulses corresponding to pulse 40 are received. Obviously if only one pulse is received, the average potential developed by detector 20 over any considerable period of time would be substantially zero. If, however, pulses are regularly received, the average output of detector 18 will be great enough to close relay 22 provided nothing interferes with the oscillation in tank circuit 18.

(2) The time interval 50 between pulse 40 and a second pulse 48 that occurs after pulse 40. Pulse 48 is of substantially the same frequency as pulse 40 so that it will be passed by receiver 12. If time interval 50 is such that pulse 48 excites tank circuit 18 in such a manner that the oscillations in this circuit are increased in amplitude, relay 22 may be held closed by the output of detector 20. If, on the other hand, time interval 50 is such that pulse 48 excites circuit 18 in such a direction that the oscillations are reduced, the output of detector 20 will not be sufficient to hold relay 22 closed. It should be obvious that the first condition mentioned above will prevail if time interval 50 is equal to an even multiple of the half period of the oscillation in tank 18 and the second condition will prevail if time interval 50 is equal to an odd multiple of the half period.

Assuming that relay 22 is closed, the pulses from amplifier 26 are passed on to load 32. One example of a load that might be used is a parallel arrangement of band pass filters designed to pass a frequency equal to the pulse repetition frequency of pulse 46. The pulse repetition frequency of pulse 46 could be controlled at the source of this pulse so that it would cause a signal to be passed by a predetermined filter and the output of this filter could be used to provide an indication or control suitable servo mechanisms.

The advantages of this system may be better understood by a brief summary of its operation. This system will transmit a reply only upon the receipt of two pulses of radio-frequency energy occurring at two different predetermined frequencies in a predetermined sequence and at a predetermined interval between the two pulses. The frequencies, sequence and time interval may be selected to fit any particular condition of operation. Furthermore, this circuit will pass on to a suitable load intelligence derived from a predetermined signal consisting of a series of three pulses of radio-frequency energy occurring at two different predetermined frequencies in a predetermined sequence and with a predetermined time relationship between pulses. All other signals will be excluded from the load. If time interval 50 is made variable as may be done by a simple adjustment at the source of the received signals, the circuit of Fig. 1 may either pass or block signals going to the load 32 while continually transmitting a reply. It should be understood that the output of modulator 28 may be used to control some other operation in place of, or in addition to, controlling the output of transmitter 30. This circuit, therefore, provides a reliable system for controlling a plurality of operations at a remote point with a minimum of danger of interference from other intentional or unintentional transmitted signals.

While there has been described what is at present considered the preferred embodiment of the invention, it will be obvious to those skilled in the art that various changes and modifications may be made therein, without departing from the invention.

What is claimed is:

1. A radio system responsive to a three-pulse dual-frequency signal, said system comprising a first and a second antenna, a first and a second receiver, means for connecting said first and second antennas to said first and second receivers whereby said receivers detect signals received by said antennas, a gate generator responsive to the output of said first receiver, means for connecting said gate generator to said second receiver to control the operation of said second receiver, a tank circuit responsive to the output of said first receiver, a detector for producing a voltage dependent upon the output of said tank circuit, switch means responsive to a predetermined output of said detector, an amplifier responsive to the output of said second receiver, a modulator responsive to the output of said amplifier, a transmitter responsive to the output of said modulator, means for connecting said transmitter to said second antenna, a load, and means for connecting said load to said amplifier output through said switch means whereby said load is energized.

2. A radio system responsive to a three-pulse dual-frequency signal, said system comprising a first and second receiver, means for applying radiant energy signals to said first and second receivers, a relay means, means whereby said first receiver controls the operation of said relay means, means whereby said first receiver controls the operation of said second receiver, an amplifier responsive to the output of said second receiver, a modulator responsive to the output of said amplifier, a transmitter, means whereby said modulator controls the output of said transmitter, a load, and means for connecting said load to said amplifier output through said relay means.

3. A radio system responsive to a three-pulse dual-frequency signal, said system comprising a first and second receiver, means for applying radiant energy signals to said first and second receiver, means whereby said first receiver controls the operation of said second receiver, a transmitter, means whereby said second receiver controls the operation of said transmitter, a tank circuit responsive to the output of said first receiver, a detector for producing a voltage indicative of the average amplitude of oscillation in said tank circuit means, relay means responsive to a predetermined output of said detector, a load, and means for connecting said load to the output of said second receiver through said relay means.

4. A radio system responsive to a three-pulse dual-channel signal, said system comprising a first and a second receiver, means for applying radiant energy signals to said first and second receivers, means whereby said first receiver controls the operation of said second receiver, a relay means, means whereby said first receiver operatively controls said relay means, a transmitter, means whereby said second receiver controls the operation of said transmitter, a load, and means for connecting said second receiver to said load through said relay means.

MARCUS D. O'DAY.

REFERENCES CITED

The following references are of record in the file of this patent:

UNITED STATES PATENTS

| Number | Name | Date |
| --- | --- | --- |
| 2,292,222 | Haigis | Aug. 4, 1942 |
| 2,465,925 | Purington | Mar. 29, 1949 |